Nov. 4, 1947.  W. D. TIPTON  2,430,089
TRANSMISSION
Filed April 6, 1944  2 Sheets-Sheet 1

INVENTOR.
William D. Tipton.
BY
Maxwell K. Murphy
ATTORNEY.

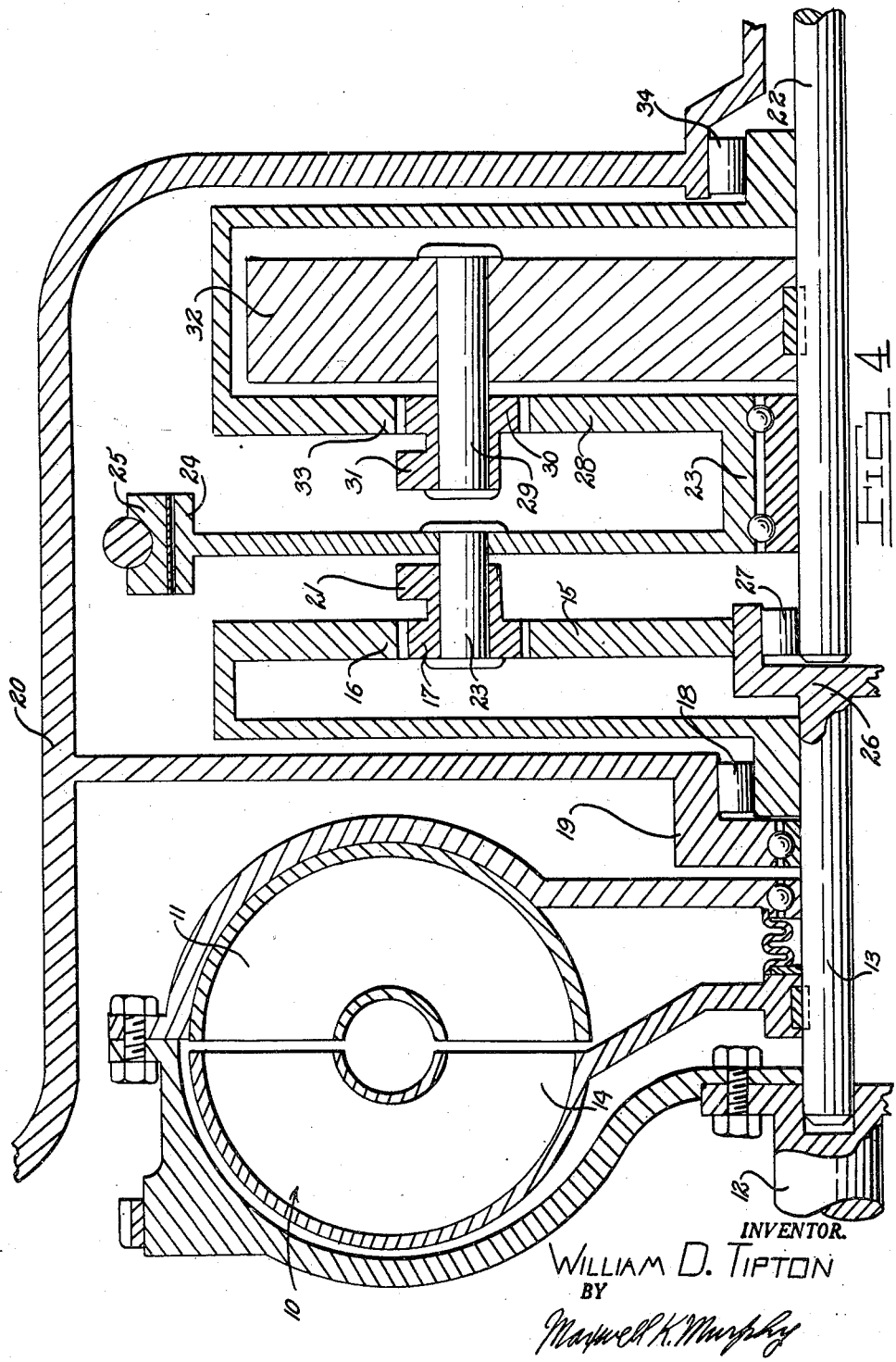

Patented Nov. 4, 1947

2,430,089

UNITED STATES PATENT OFFICE 2,430,089

TRANSMISSION

William D. Tipton, Stoneleigh, Md.; Elizabeth Barrett Tipton executrix of said William D. Tipton, deceased Application April 6, 1944, Serial No. 529,759

6 Claims. (Cl. 74—189.5)

This invention relates to automotive transmissions of the semi-automatic self shifting type.

The principal object of the invention is to provide a self-shifting vehicle transmission wherein the change in driving ratio is partially dependent upon the speed and torque conditions obtaining, but primarily upon driver control. While the invention is illustrated in connection with a fluid coupling and is preferably used therewith, it can be used without such a coupling if desired.

Another object is to provide a simpler and more economically constructed semi-automatic transmission than those now in use.

Other objects and advantages of the invention will be apparent to those skilled in the art from the following description wherein a preferred embodiment is disclosed.

In the drawings accompanying the description,

Fig. 4 is a complete illustration of the schematic showing of Fig. 1.

Figure 1:
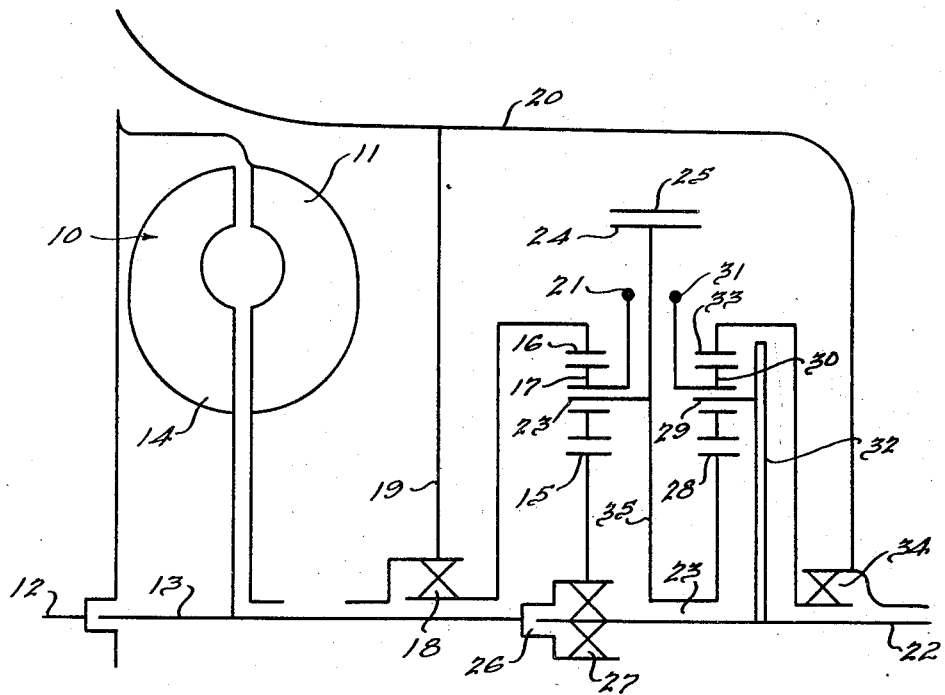
Fig. 1 is a schematic showing of the upper half of my improved transmission, certain parts unnecessary to an understanding of the invention such as seals, bearings, valves, etc., being omitted for the sake of clarity.

Referring to Fig. 1 it will be seen that a fluid coupling 10 having an impeller 11 is drivingly connected to an engine crankshaft 12, which pilots an intermediate shaft 13. The coupling has the usual runner 14 disposed in fluid receiving relation with respect to the impeller 11.

The runner 14 is carried by the shaft 13 which carries at its rear end a sun gear 15. The latter is one element of a planetary gearset which also includes a ring gear 16 and a planet pinion 17. The ring gear 16 is prevented from reverse rotation by means of an overrunning brake 18 of conventional type. The brake 18 is preferably of the roller type and leans against an inside wall 19 of the transmission casing 20.

The pinion 17 (of which there are preferably three) has a counterweight 21 carried thereby (see detail in Fig. 3) which is adapted to be acted upon by centrifugal force as a result of rotation of the pinion and revolution thereof about the axis of driven shaft 22. The latter is adapted to be connected to the vehicle driving wheels in the usual manner. The pinions 17 are mounted on a carrier 23 which is journaled at 23 on shaft 22 and carries a brake drum 24 adapted to be engaged by a brake band 25. The brake band 25 may be manually controlled by a pedal or it may be automatically controlled by power means in a manner similar to that shown in my co-pending application Serial No. 522,735, filed February 17, 1944.

The shaft 22 is piloted in the hollow end 26 of the shaft 13 and an overrunning roller clutch 27 is disposed between the two shafts. The clutch 27 is arranged so that it permits the shaft 13 to overrun the shaft 22, but prevents the shaft 22 from rotating faster than shaft 13.

Planet carrier 23 carries a sun gear 28 which is an element of a rear planetary gearset. This gearset has a carrier 29 mounting planet pinions 30, the latter having counterweights 31. The carrier 29 is mounted on the shaft 22 through a flywheel 32. The latter has relatively great inertia and acts to damp the torque fluctuations in the transmission caused by the counterweights 21 and 31 and prevents transmission of these impulses to the shaft 22.

The ring gear 33 of the rear gearset has an over-running connection 34 with the casing 20. The connection 34 is preferably of the roller type and prevents reverse rotation of gear 33 while allowing free forward rotation thereof.

Figure 3:
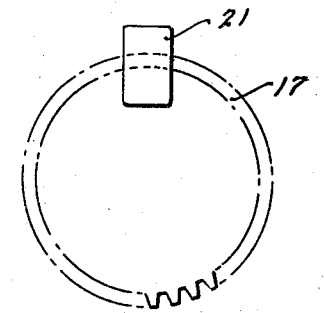
Fig. 3 is a detail of a counter-weighted pinion as used in the transmission.

The detail in Fig. 3 illustrates the pinion 17 and the counterweight 21. The pinion 30 is identical in form.

Operation of the device is as follows:

With the car at rest and the engine idling, the fluid coupling 10 slips sufficiently to permit the car to remain stationary without creep. An increase in engine speed will cause runner 14 to rotate at increased speed and apply torque to the forward planetary gearset.

The brake band 25 is free from the drum 24 at this time and the torque on sun gear 15 will cause the carrier 23 to be rotated forwardly, the ring gear 16 being prevented from reverse rotation by brake device 18.

Rotation of carrier 23 will, through the intermediary of member 35, cause rotation of sun gear 28 of the rear planetary set. The ring gear 33 of the said rear set is prevented from reverse rotation by brake device 34 therefore the carrier 28, flywheel 32 and shaft 22 will be rotated driving the vehicle forwardly in low speed ratio, the two reduction gearsets functioning in series.

Figure 2:
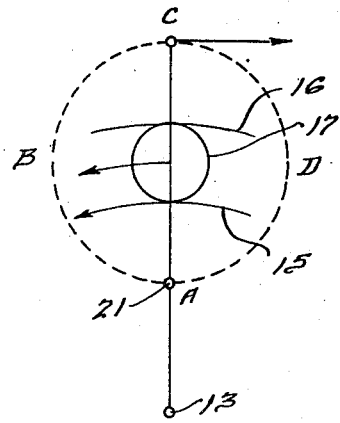
Fig. 2 is a diagrammatic illustration of certain principles of operation of the Fig. 1 device.

As the car speeds up and torque difference on shafts 13 and 22 diminishes, the driver can effect a shift from low to intermediate speed ratio by momentary release of the engine throttle. This can be understood by reference to Fig. 2. When the engine is supplying torque to shaft 13, planet gears 17 are urged to rotate through arc ABCD. The counterweights 21 set up slight torque fluctuations which are absorbed in the fluid coupling 10 since the flywheel 32 resists these fluctuations through its inertia. When rotating freely with no torque being applied or taken from the gearset, the pinions 17 and weights 21, will have some tendency to rotate even though they are under the influence of centrifugal force resulting from the rotation of the carrier 23 about the axis of shaft 22. The torque supplied to the pinions during arc ABC by this centrifugal force is just about sufficient to carry them through arc CDA against centrifugal force. Friction, windage, etc., will deter this rotation of course and may stop the pinions.

When torque from the engine is applied however, the pinions will rotate and continue to rotate even at low carrier speeds. When the throttle is momentarily released, the torque through the transmission system is reversed as the car momentarily overruns the engine. This reverses the reaction in the planetary gearset and causes the gear 16 to break away from the housing wall 19 and rotate forwardly as permitted by roller brake 18. The planet pinions 17 then slow down and the centrifugal force about the axis of shaft 22 will act on the weights 21 and stop the pinions from rotation about their own axis. Depression of the accelerator to open the throttle will now cause the planetary gearset to rotate as a locked-up unit because the centrifugal force on the weights 21 applied through their rotation about the axis of shaft 22 is sufficient to overcome the tendency for the pinions to rotate. Thus, the forward planetary gearset is "short-circuited" and a step-up in ratio is effected.

At a higher vehicle speed, release of the throttle will cause the rear planetary gearset to lock up in a similar manner and a shift to direct drive is effected.

The forward gearset will lock up first because it rotates faster than the rear set. In coming down to idling speed, as the speed of the locked-up units falls a condition will be arrived at where the torque supplied to the pinions tending to cause them to rotate about their own axes is greater than the force on the weights tending to hold them at outer dead center. The respective gearset will start to function and a step-down in ratio will result. If the two gearsets are identical in ratio it does not matter which one shifts down first. It is probably preferable to provide a greater ratio change in one of the gearsets than in the other in order to achieve the best accelerating characteristics. If the two sets are made identical in ratio economy is achieved because the parts are interchangeable except for the pinions which must have different counterweights.

Overrunning clutch 27 is preferably manually controlled so that it can be thrown into and out of operation by the driver. This device is necessary for starting the engine by towing or pushing the car. Once the car is moving, centrifugal force locks the pinions and two way drive results.

At very low vehicle speeds the car will freewheel through clutch 27 which is desirable.

It is contemplated that a reverse gear will be used in connection with the transmission but showing thereof has been omitted for the sake of clarity. The brake band 25 may be set to stop rotation of the carrier 23 and gear 28 thereby to permit shifting into reverse, etc.

The fluctuating torque of the pinions is effectively damped by the fluid coupling. If a fluid clutch is not used, it probably will be necessary to provide a spring damper of some sort.

Having thus described one embodiment of my invention for purposes of illustration, I wish it understood that I do not intend thereby to limit the invention in its broader aspects except as defined in the claims appended below.

I claim:

1. In a vehicle power transmission, a driving shaft; a driven shaft; a planetary gearset having a counterweighted pinion as an element thereof connected between said shafts; fluid clutch means on said driving shaft for absorbing torque fluctuations caused by said pinion and a flywheel on said output shaft for preventing transmission of torque fluctuations thereto.

2. In a vehicle power transmission, an engine driven shaft; a fluid impeller driven by said shaft; a fluid runner driven by said impeller; an intermediate shaft driven by said runner; a sun gear driven by said intermediate shaft; a ring gear; a planet carrier having counterweighted pinions thereon in mesh with said sun and ring gears; a brake for controlling rotation of said carrier; an output shaft, and means including a flywheel for connecting said carrier to said output shaft.

3. In a vehicle power transmission, an engine driven shaft; a fluid impeller driven by said shaft; a fluid runner driven by said impeller; an intermediate shaft driven by said runner; a sun gear driven by said intermediate shaft; a ring gear; a planet carrier having counterweighted pinions thereon in mesh with said sun and ring gears; a second sun gear connected to said carrier for rotation therewith; a second ring gear; a second carrier having counterweighted pinions thereon in mesh with said second sun and ring gears; an output shaft, and means connecting said second carrier to said output shaft.

4. In a vehicle power transmission, an engine driven shaft; a fluid impeller driven by said shaft; a fluid runner driven by said impeller; an intermediate shaft driven by said runner; a sun gear driven by said intermediate shaft; a ring gear; a planet carrier having counterweighted pinions thereon in mesh with said sun and ring gears; a second sun gear connected to said carrier for rotation therewith; a second ring gear; a second carrier having counterweighted pinions thereon in mesh with said second sun and ring gears; an output shaft, and means connecting said second carrier to said output shaft including a relatively heavy flywheel member.

5. In a vehicle power transmission, an engine driven shaft; a fluid impeller driven by said shaft; a fluid runner driven by said impeller; an intermediate shaft driven by said runner; a sun gear driven by said intermediate shaft; a ring gear; a planet carrier having counterweighted pinions thereon in mesh with said sun and ring gears; an output shaft, and an inertia member for connecting said carrier to the output shaft.

6. In a vehicle power transmission having an engine driven shaft and a fluid coupling, a pair of planetary gearsets connected in series between said coupling and the driving means for the vehicle, each of said gearsets having counterweighted planet pinions arranged such that they resist rotation of the gears in said gearsets when subjected to centrifugal force, and shock absorbing means for connecting said gearsets and said driving means.

WILLIAM D. TIPTON.

REFERENCES CITED

The following references are of record in the file of this patent:

UNITED STATES PATENTS

| Number | Name | Date |
|---|---|---|
| 2,316,390 | Biermann | Apr. 13, 1943 |
| 1,935,589 | Dodge | Nov. 14, 1933 |
| 2,091,210 | Mattia | Aug. 24, 1937 |
| 1,959,349 | Dodge | May 22, 1934 |

FOREIGN PATENTS

| Number | Country | Date |
|---|---|---|
| 329,724 | Great Britain | May 29, 1930 |